(12) United States Patent
Bates et al.

(10) Patent No.: US 8,646,660 B2
(45) Date of Patent: Feb. 11, 2014

(54) REUSABLE BEER KEG

(76) Inventors: Thomas W. Bates, Kila, MT (US); Dan Morgan, Vacaville, CA (US); Leslie W. Ross, San Rafael, CA (US)

(*) Notice: Subject to any disclaimer, the term of this patent is extended or adjusted under 35 U.S.C. 154(b) by 0 days.

(21) Appl. No.: 13/317,556

(22) Filed: Oct. 21, 2011

(65) Prior Publication Data

US 2012/0104035 A1    May 3, 2012

Related U.S. Application Data

(63) Continuation-in-part of application No. 13/138,789, filed as application No. PCT/US2010/001008 on Apr. 1, 2010.

(60) Provisional application No. 61/211,728, filed on Apr. 1, 2009.

(51) Int. Cl.
  *B65D 83/00*    (2006.01)

(52) U.S. Cl.
  USPC .............. 222/400.7; 222/1; 222/95; 222/105; 222/183; 222/325; 220/495.03; 220/495.06; 220/592.19

(58) Field of Classification Search
  USPC ......... 222/1, 95–96, 105, 183, 325, 466, 469, 222/400.7; 220/495.03, 495.06, 592.16, 220/592.17, 592.18, 592.19, 592.23, 466, 220/469
  See application file for complete search history.

(56) References Cited

U.S. PATENT DOCUMENTS

| | | | | |
|---|---|---|---|---|
| 4,005,813 | A | * | 2/1977 | Johnston ....................... 228/184 |
| 4,690,299 | A | * | 9/1987 | Cannon ..................... 220/592.19 |
| 5,115,841 | A | * | 5/1992 | Horino et al. ................. 141/250 |
| 5,129,534 | A | * | 7/1992 | Dunn ........................... 220/4.33 |
| 5,667,110 | A | * | 9/1997 | McCann et al. ............ 222/386.5 |
| 6,651,845 | B1 | * | 11/2003 | Schroeder ....................... 222/83 |
| 6,666,358 | B1 | * | 12/2003 | Field ........................... 222/400.7 |
| 6,925,872 | B2 | * | 8/2005 | Hadala ............................ 73/295 |
| 7,111,442 | B1 | * | 9/2006 | Van Baal et al. ................ 53/473 |
| 2008/0245799 | A1 | * | 10/2008 | Anderson et al. ........ 220/495.06 |

FOREIGN PATENT DOCUMENTS

FR         2 952 357 A1    5/2011

* cited by examiner

*Primary Examiner* — Frederick C Nicolas
(74) *Attorney, Agent, or Firm* — Jay P. Hendrickson

(57) ABSTRACT

A reusable beer keg is disclosed including a hollow beer keg body with a dispenser tube assembly having a dispenser valve, dispenser tube, and a disposable bladder. The dispenser valve is releasably attached to a top portion of the keg body and the dispenser tube and bladder extend into the interior of the keg body. When beer flows through the open dispenser valve and into the bladder, the beer causes the bladder to expand until it contacts the inside surface of the keg body. When the beer keg has been emptied it can be returned to the brewery for reuse by cleaning the dispenser valve, dispenser tube and disposing of the used bladder. The beer keg parts can then be reassembled, using a new bladder in place of the used bladder.

6 Claims, 15 Drawing Sheets

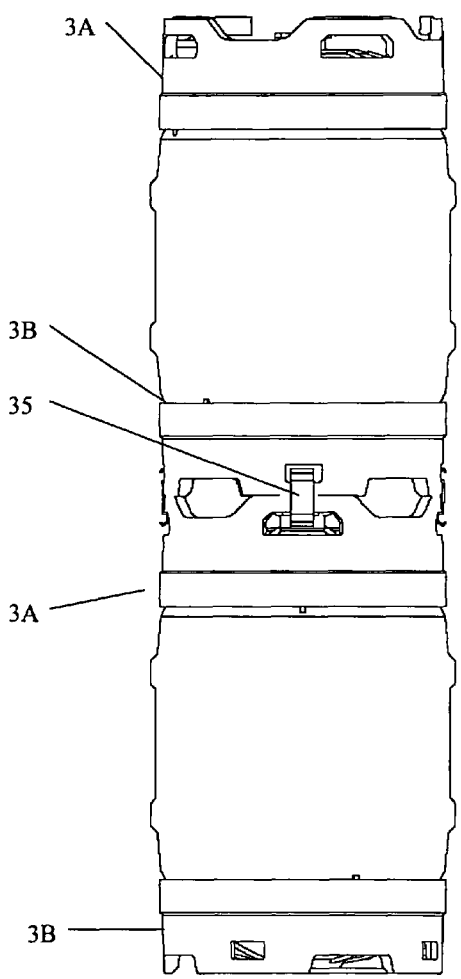
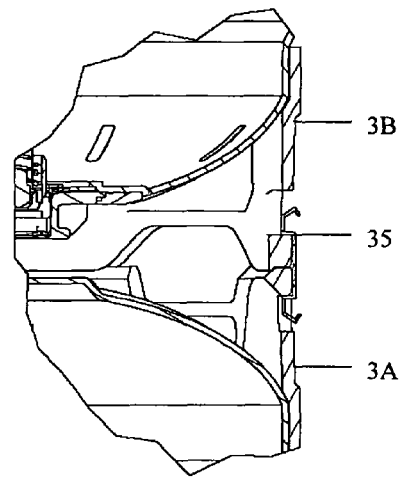
FIG. 9A
FIG. 9B

REUSABLE BEER KEG

This application is a continuation-in-part of U.S. patent application Ser. No. 13/138,789 filed on Sep. 29, 2011, which is a national stage application from PCT/US2010/001008 filed on Apr. 1, 2010, which relates to and claims the benefit under 35 U.S.C. §119(e) of U.S. Provisional Application No. 61/211,728, filed on Apr. 1, 2009.

TECHNICAL FIELD

This application relates to pressurized beer containers or kegs and, specifically, to pressurized beer containers that are designed to be returned to a brewery or bottler for cleaning and refilling.

BACKGROUND

Most breweries presently supply beer to commercial establishments, like restaurants and bars, in stainless steel kegs. In the United States a full keg is a 15.5 gallon U.S. gallon barrel, sometimes referred to as a half-barrel. In European countries the keg most comparable to the US full keg is a keg having a size of 50 liters (13.21 gal). Normally the keg will have long dispenser-like tube extending from the top of the keg to just above the keg's inside bottom surface. In addition, a pressurizing valve is typically connected to the top of the keg and dispenser tube and is used with a tap valve to pressurize the beer within the keg, causing the beer to flow from the bottom of the keg and up through the dispenser tube and tap, and into a serving container.

Stainless steel beer kegs are expensive to manufacture and are intended to be returned by the commercial establishment to the brewery for cleaning and refilling. Repeatedly cleaning the stainless steel kegs is particularly expensive due to the substantial amounts of water that must be used and sent to a treatment facility. An additional expense arises from that fact that after the same stainless steel keg has been returned to the brewery about 20 times, the keg must be reworked to remove dents that would otherwise reduce the internal volume to an unacceptable degree. Another well recognized expense to the brewery industry is that a large percentage of stainless steel kegs are never returned due to theft, causing the brewery to incur substantial economic loses. Several attempts have been made to reduce these expenses by producing relatively inexpensive plastic and/or composite beer kegs that are not returned to the brewery, but are either disposable or can be sent to a plastic recycling facility for grinding into raw material for use in the production of other plastic articles. (See for example, U.S. Pat. No. 6,666,358). In this regard, although disposable kegs certainly eliminate the economic costs associate with the theft of stainless steel kegs as well as the cost of cleaning the kegs, disposable kegs have other costs associated with having to dispose of the kegs and the contamination of the environment, which are costs that are not associated with the use of stainless steel kegs. Further, even if the kegs are sent to a plastic recycling facility, there are the considerable costs associated with collecting, sorting, cleaning and grinding the kegs into a reusable form that can then be used to manufacture other plastic products.

Accordingly, what is needed is a reusable beer keg that is substantially less expensive to manufacture than a stainless steel keg but can be returned and refilled by the brewer just like a stainless steel keg but, unlike a stainless steel keg, does not need to be cleaned. In addition, the reusable beer keg should be produced in a manner that would make it less desirable to persons who might be inclined to steal it. As will be apparent from the description that follows, the reusable beer keg of the present invention satisfies these needs and provides other unique and desirable features.

SUMMARY OF THE INVENTION

A reusable beer keg is disclosed which comprises a hollow beer keg body with the keg body having a keg opening for providing access to the interior of the keg body; a dispenser valve; a dispenser tube with the top end of the tube connected to the dispenser valve; a dispenser tube assembly comprising a disposable bladder having a top and bottom circularly shaped bladder sheet, with the perimeter of the top bladder sheet attached to the perimeter of the bottom bladder sheet and with the top bladder sheet having a bladder opening, with the dispenser tube disposed through the bladder opening, with the bladder opening releasably secured to the dispenser valve, and with the bottom end of the dispenser tube releasably attached to the inside surface of the bottom bladder sheet, thereby forming six longitudinal wave-like segments within the disposable bladder; and whereby the dispenser tube assembly can be disposed through the keg opening, with the dispenser valve releasably attached to the keg body; and the dispenser valve can be operated to supply beer to the interior of the bladder and then operated to supply gas pressure to the beer, causing the beer to flow through the dispenser tube and dispenser valve.

A method for using a reusable beer keg is also disclosed, comprising the steps of:
A method for using a reusable beer keg, comprising the steps of:
  a) providing a hollow beer keg body with the keg body having a keg opening for providing access to the interior of the keg body;
  b) assembling a dispenser tube assembly by attaching a dispenser valve to an end of a dispenser tube, disposing an opposite end of the dispenser tube through an opening of a disposable bladder, and releasably attaching said other end of said dispenser tube to the disposable bladder;
  c) disposing the dispenser tube assembly through the keg body opening and releasably attaching the dispenser valve to the keg opening, thereby creating the reusable beer keg;
  d) dispensing beer into the interior of the bladder;
  e) dispensing pressurized gas into the interior of the bladder, causing the beer to flow up through the dispenser tube;
  f) disassembling the reusable beer keg after it has dispensed the beer by releasing the dispenser valve from its engagement with the keg body, removing the dispenser tube assembly from the interior of the keg body, and releasing the bladder from its engagement with the dispenser valve;
  g) disposing of the disposable bladder;
  h) cleaning the dispenser valve and dispenser tube; and
  i) reassembling the reusable beer keg as in steps (b) and (c) above by reusing the keg body, cleaned dispenser valve and dispenser tube, and using a new disposable bladder.

BRIEF DESCRIPTION OF THE DRAWINGS

FIG. 9A is a side view of two reusable beer kegs, with one keg stacked above the other keg and the kegs secured together with a locking strap; and FIG. 9B is a partial cross-sectional diagram of the beer kegs illustrated in FIG. 9A further illustrating the arcuate surfaces formed on the bottom surface of one keg and on top surface of the other keg.

DETAILED DESCRIPTION OF PREFERRED EMBODIMENTS

Figure 1:
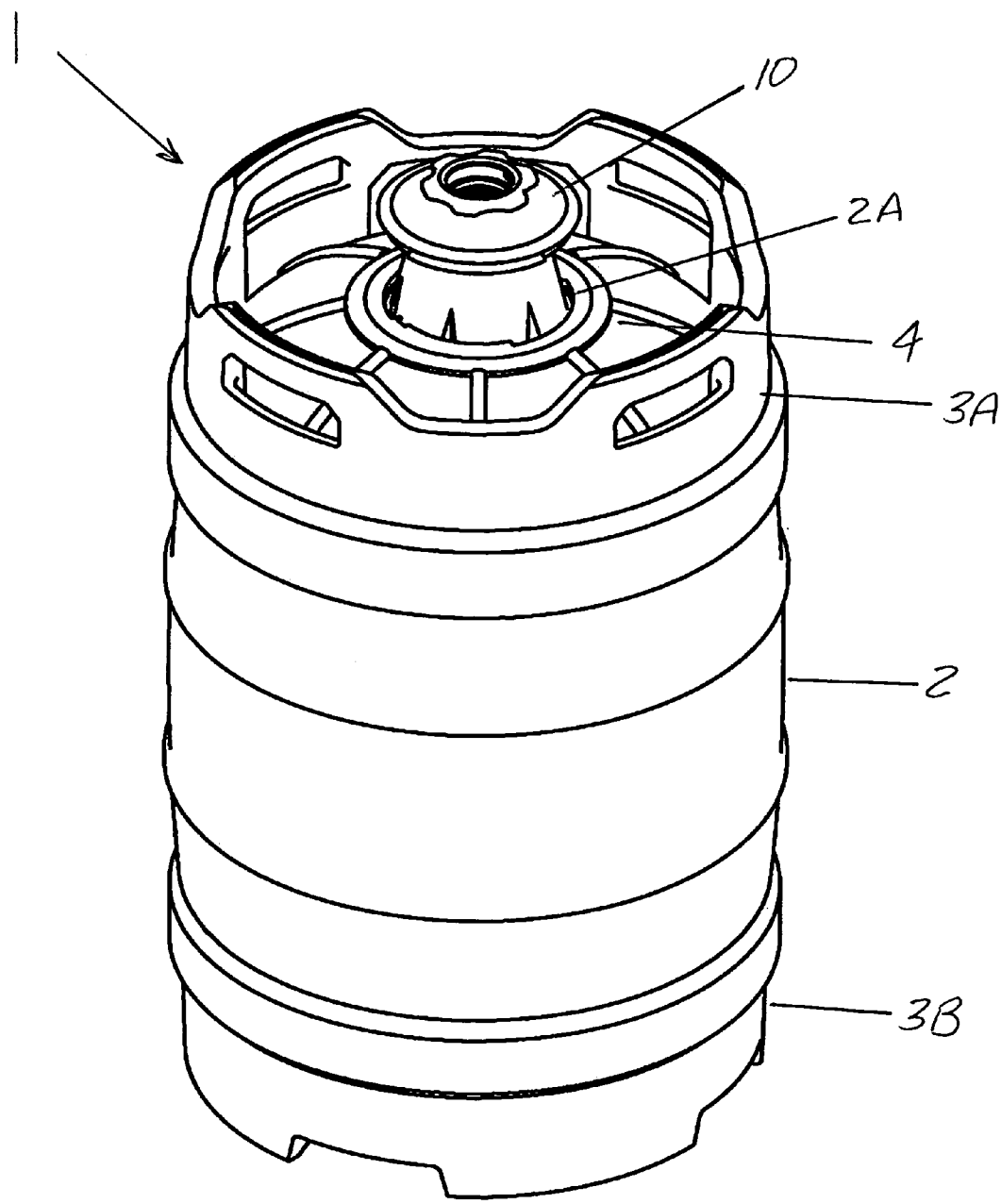
FIG. 1 is a perspective view of the reusable beer keg with the dispenser tube assembly partially disposed into the interior of the keg body.

The reusable beer keg 1 of the present invention is generally illustrated in the perspective view of FIG. 1. Beer keg 1 has a generally cylindrical shape, with arcuate shaped ends, and is intended to approximately conform to the size and shape of commonly used stainless steel beer kegs, and specifically to either a 15.5 U.S. gal or a 50 L European stainless steel keg. In a preferred embodiment, beer keg 1 comprises a hollow one-piece keg body 2 that is molded from a plastic material utilizing a single or unitary mold process in order to form the one-piece keg body in which the composition of the plastic material forms a continuous and homogenous unit. Preferably, the plastic material can be a polyethylene elastomer or a polyurethane elastomer. For example, an acceptable plastic can be TADCO 37452, a Shore D56 polyurethane rotomolding product. In this embodiment, the molded keg body 2 has an inside diameter of approximately 16 inches and an inside height of approximately 24 inches. Preferably, keg body 2 has a nominal wall thickness of approximately 0.2 inches; however, the wall thickness can be increased in at least two areas where additional structural integrity is needed. First, the keg wall thickness can be increased preferably by providing two integral circumferential bands that extend around the perimeter of keg body 2 and are approximately 0.4 inches thick, with the bands being formed during the unitary molding process of keg body 2. Second, the thickness of the top and bottom sections of keg body 2 can be increased preferably by providing eight elongate members that extend radially within the molded top and bottom portions of keg body 2, with each elongate member being approximately 0.4 inches thick and with the members also being formed during the unitary molding process of keg body 2. Alternatively, the keg body can be molded into two sections: a lower body section and a lid section, with the two sections adapted to be connected so as to form the keg body. Keg body 2 has an annular and concentrically positioned opening 2A through its top end that provides access to the interior of the hollow keg body. Keg body 2 also includes a top cylindrical member 3A that is attached to the top outside surface of keg body 2 and surrounds annular opening 2A. The keg body 2 further includes a bottom cylindrical member 3B that is attached to the bottom outside surface of keg body 2. Preferably, top and bottom cylindrical members, 3A and 3B, are made of the same plastic material that is used to mold keg body 2 and each cylindrical member is attached to keg body 2 by gluing the member to the outside surface of the body. A valve attachment collar 4 is attached, preferably by gluing, to the outside surface of the top portion of keg body 2 and is positioned such that the circularly shaped opening within the collar is positioned above and concentrically with keg opening 2A. The figure also illustrates a dispenser tube assembly 10 that has been partially disposed into the interior of the keg body 2 by passing the assembly through valve attachment collar 4 and keg opening 2A.

Although the preferred embodiment of beer keg 1 is described herein to conform to the size and shape of commonly used stainless steel beer kegs, and specifically to either a 15.5 U.S. gal or a 50 L European stainless steel keg, the present disclosure is also applicable to other embodiments with beer kegs having different sizes, shapes and volumetric capacities.

Figure 2:
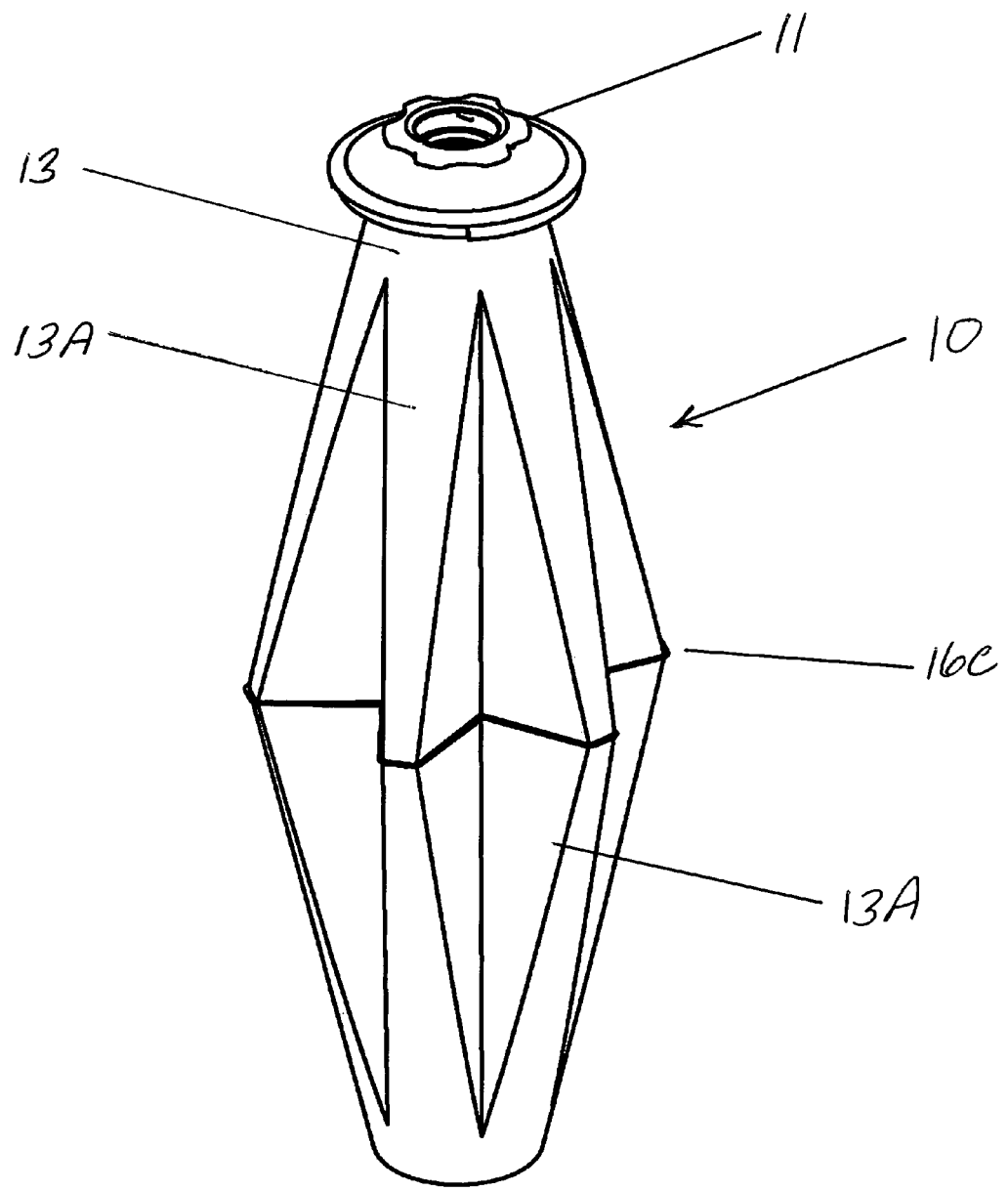
FIG. 2 is a perspective view of the dispenser tube assembly

As illustrated in FIG. 2, dispenser tube assembly 10 comprises: a dispenser valve 11 that is used to regulate in the inflow and outflow of beer; an expandable and disposable bladder 13 that is illustrated in a unexpanded and axially extended configuration, forming six (6) generally uniform, longitudinal wave-like segments 13A; and a dispenser tube 12 (shown in FIG. 3) that is disposed within the interior of bladder 13 and utilized to remove pressurized beer from the expanded bladder. Dispenser tube 12 is attached to dispenser valve 11 by connecting a top end of the dispenser tube to the interior of the dispenser valve, and bladder 13 is releasably attached to dispenser valve 11. A more detailed description of the dispenser valve 11 and its attachment to dispenser tube 12 and bladder 13 is presented in connection with the discussion of FIGS. 3B, 5C, 8A and 8B. As shown in FIG. 1, in order to use beer keg 1, the dispenser tube assembly 10 is inserted into keg body 2 by disposing the assembly through keg body opening 2A and valve attachment collar 4, with assembly 10 concentrically positioned within the interior of keg body 2.

Figures 3A, 3B:
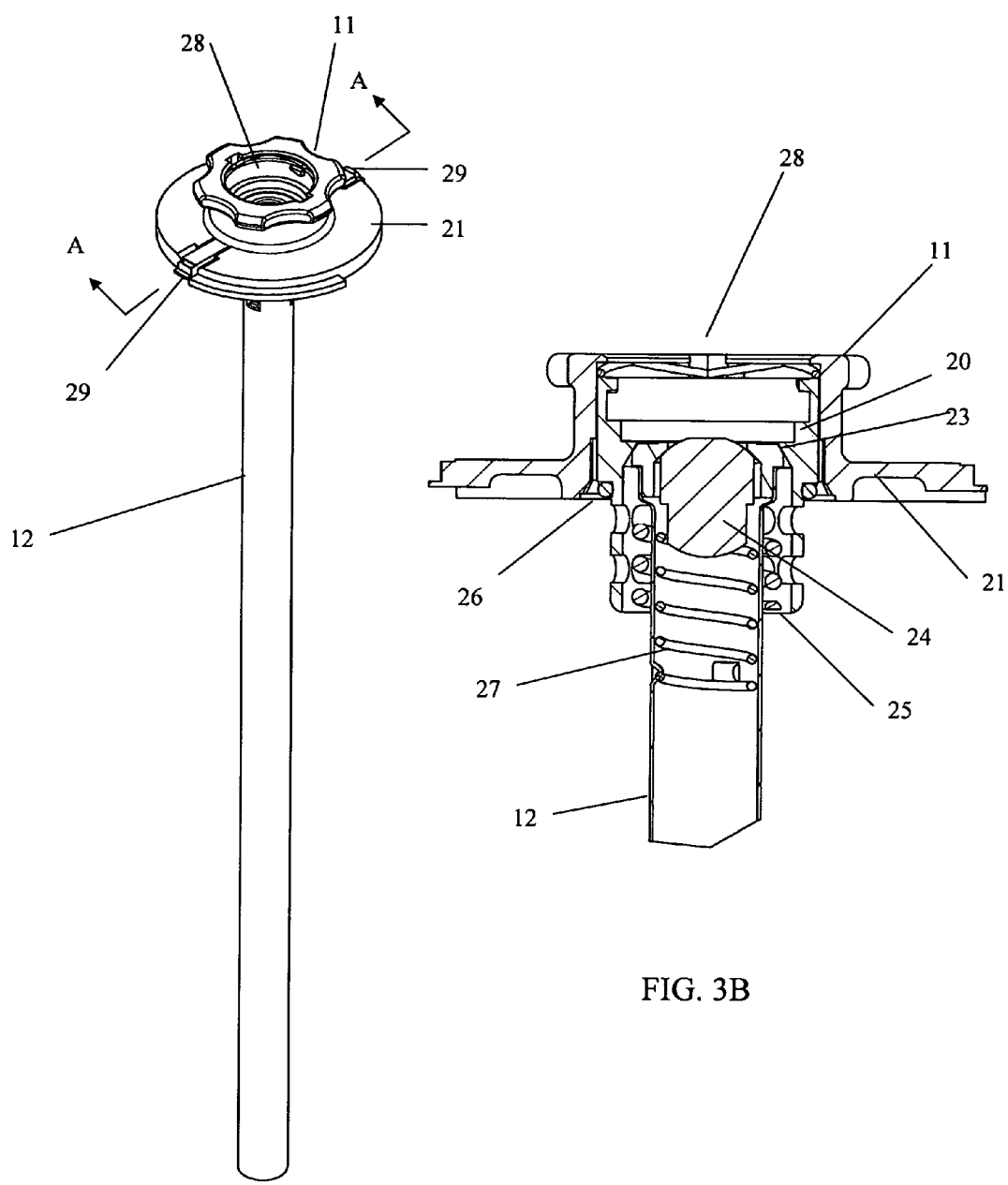
FIG. 3A is a perspective view of the dispenser tube and dispenser valve and FIG. 3B is partial cross-sectional plan view of the dispenser tube and dispenser valve.

FIGS. 3A and 3B present a more detailed illustration of dispenser valve 11 and dispenser tube 12. Dispenser valve 11 comprises an annular valve body 20, annular bottom flange 21, including a pair of radially extending cantilever arms 29, annular valve seal 23, annular valve inner seat 24, valve outer spring 25, an O-ring 26, valve locking member 29, and an inlet port 28. Valve body 20, valve inner seat 24, and valve outer spring 25 are each preferably made of 316 stainless steel, and valve seal 23 and resilient O-ring 26 are each preferably made of Viton®, respectively. The top end of dispenser tube 12 is connected to the inside of valve body 20 with outer valve spring 25 disposed around the outside surface of the dispenser tube. A valve inner spring 27 is concentrically disposed within the interior of dispenser tube 12 with the bottom of the spring in contact with an annular ledge and the top of the spring is in contact with valve seat 24. Dispenser tube 12 and inner valve spring 27 are preferably made of 316 stainless steel. The operation of the dispenser valve will be described in connection with FIGS. 9A and 9B.

Figure 4A:
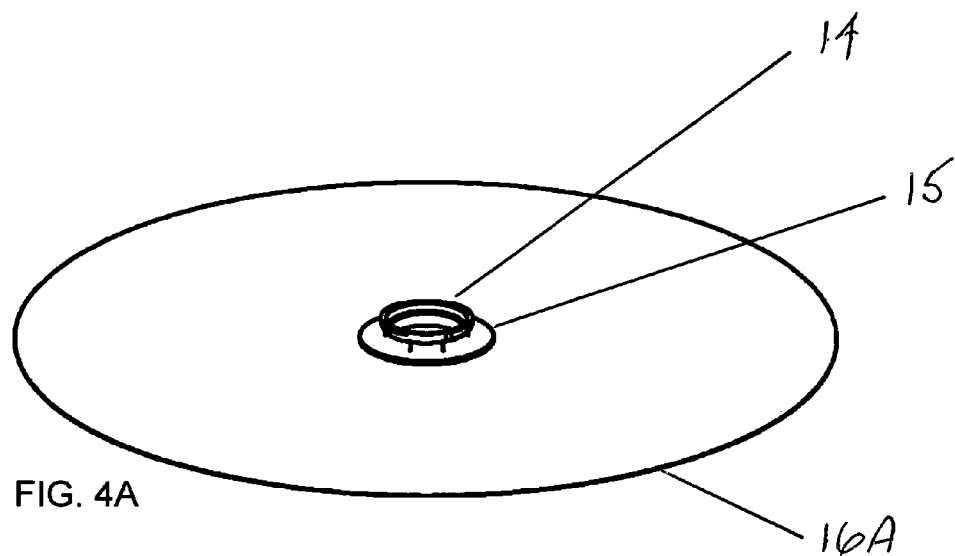
FIGS. 4A through 4D illustrate the disposable bladder.
Figure 4B:
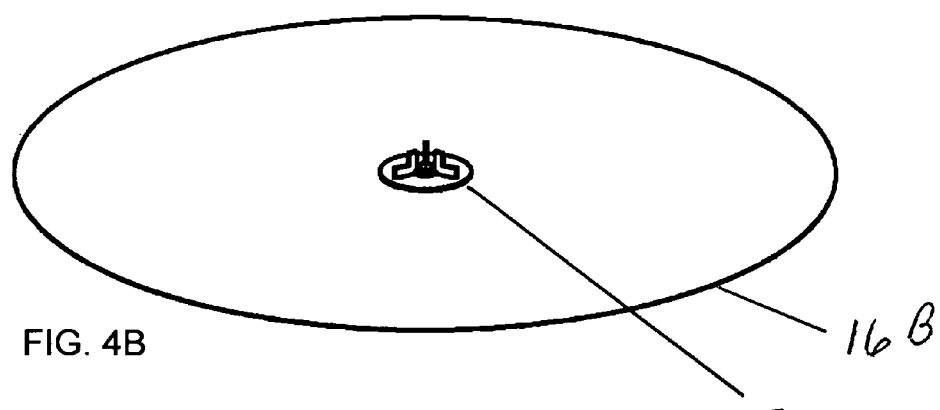
Figure 4C:
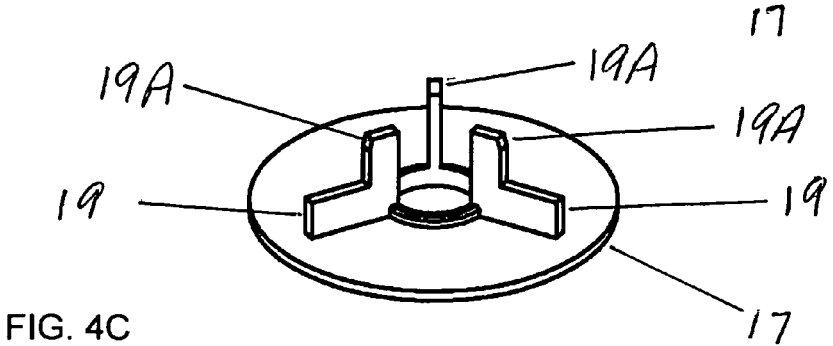
Figure 4D:
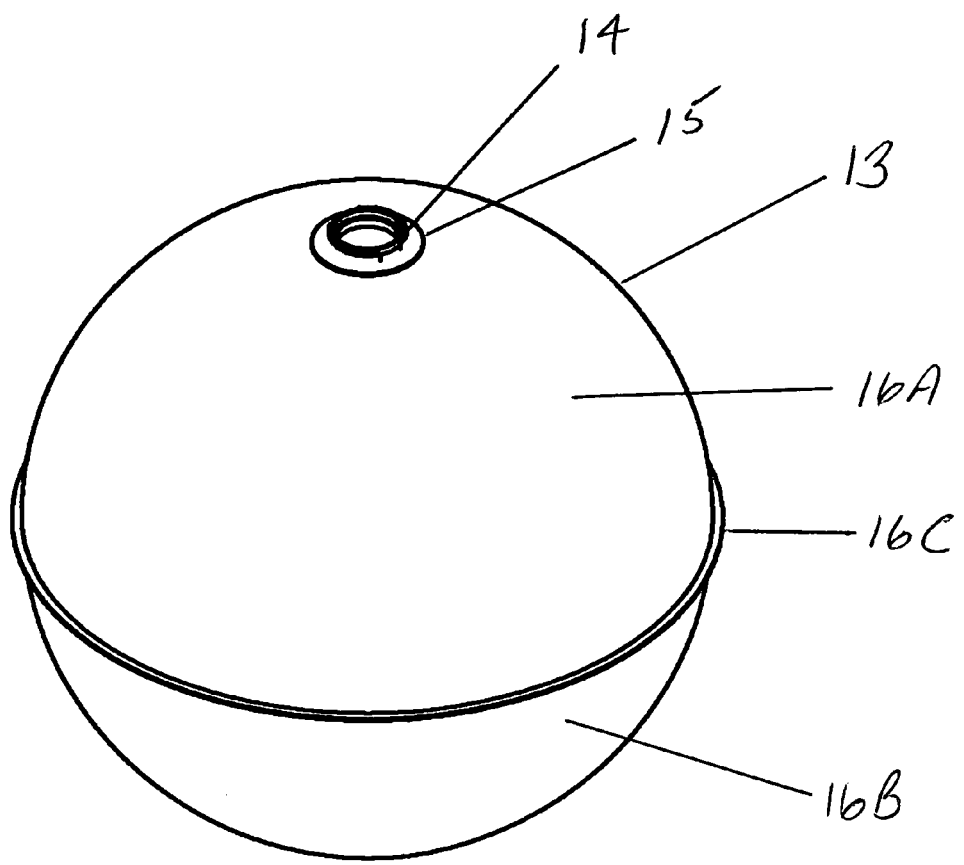

FIGS. 4A through 4D illustrate a preferred bladder configuration. Preferably, as shown in FIGS. 4A and 4B, the bladder comprises a top and bottom circularly shaped bladder sheet, 16A and 16B, with the circumferential edges of the sheets welded together forming a seam 16C, thereby forming bladder 13 as shown in FIG. 4D. Top bladder sheet 16A of bladder 13 also contains a circular and concentrically positioned opening through the bladder that provides access to the interior of the bladder. In the preferred embodiment, the bladder material has the characteristics of being flexible, impermeable to beer, substantially impermeable to oxygen, and substantially inert when in contact with beer. More specifically, it is preferable for the bladder material of disposable bladder 13 to comprise a multi-layer material having an inner layer of a thermoplastic material, like polyethylene, with a wall thickness of approximately 3 mils, and an outer layer of BIAX nylon with a wall thickness of approximately 0.6 mils, and with the bladder material being formed by bonding the thermoplastic and BIAX nylon layers together using an extrusion process. Optionally, the BIAX layer can be treated before the bladder material's inner and outer layers are bonded together in order to provide additional oxygen barrier properties. The bladder material can also be treated to preferably provide a bladder material having a coefficient of friction of between approximately 0.1 and approximately 0.2 by applying a low coefficient of friction substance to the outer surface of the bladder material and/or applying an embossing process to the bladder material.

Regardless of the type of material that is used to form bladder 13, as further illustrated in FIG. 4A, an annular member 15, preferably made of polyethylene, is attached to the inside surface of the bladder and surrounds the bladder opening, with a cylindrically shaped annular fitment 14 integral with annular member 15 and extending through the bladder opening and extending away from the outside surface of the bladder. As will be illustrated in more detail in FIG. 5B, annular fitment 14 is utilized to releasably attach bladder 13 to dispenser valve 11. Continuing with FIG. 4B, a centering fitment 17 is attached to the inside surface of bottom bladder sheet 16B of bladder 13, preferably by welding the bottom surface 18 of the centering fitment to the bladder, such that the geometric center of centering fitment 17 is concentric with the geometric center of bottom bladder sheet 16B. In order to more clearly illustrate the structure of centering fitment 17, FIG. 4C shows the fitment removed from the bladder. Centering fitment 17 preferably comprises three (3), evenly spaced L-shaped members 19, with each L-shaped member having a distal end 19A. As will be described in more detail in FIG. 5B, centering fitment is used to releasably attach bladder 13 to the bottom of dispenser tube 12.

In order to ensure that the bladder 13 contacts the inside surface of keg body 2 when the bladder is filled with beer, the bladder must be sized such that the diameter of the circularly shaped bladder sheets is equal to or greater than a predetermined keg body dimension (X) measured along an inside top or bottom surface of keg body 2. More specifically, dimension X can be described by passing a hypothetical vertical plane through keg body 2 such that the plane passes through and is co-extensive with the axial center line of the keg body; then by passing a hypothetical horizontal plane through keg body 2 such that the plane passes through the midsection of the keg (i.e. halfway between the keg opening 2A and the bottom of the keg body) and is perpendicular to the axial center line of the keg body. Dimension X can then be defined, for example, by the dimension of the U-shaped line represented by the intersection of the vertical plane with the keg body below the intersection of the horizontal plane with the keg body. For the preferred 15.5 gallon keg, as in beer keg 1, dimension X is measured to be 32 inches. Thus, in the preferred embodiment bladder 13 must have a diameter that is 32 inches or greater.

Dimension X can also be calculated by approximating the keg body 2 as consisting of a cylinder forming the keg body's mid-section, with spherical sections forming the keg body's top and bottom ends. In that case dimension X can be calculated as follows:

$$X = \text{length of the cylinder} + (\tfrac{1}{2}(\text{diameter of the cylinder} \times 3.14)).$$

Figure 5A:
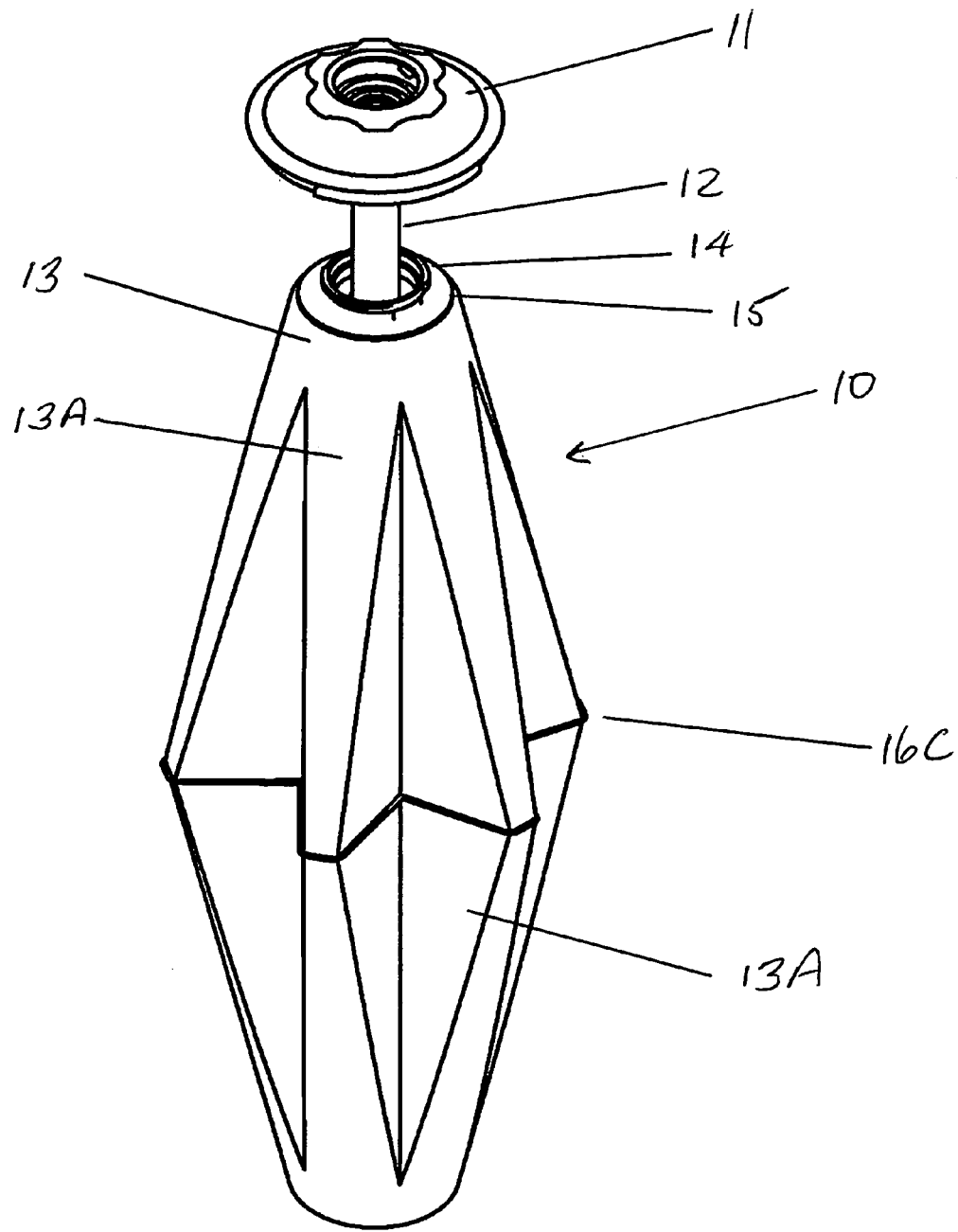
FIG. 5A is a perspective illustration of the dispenser tube and dispenser valve partially disposed through the bladder fitment and extending into the interior of the bladder.
Figure 5B:
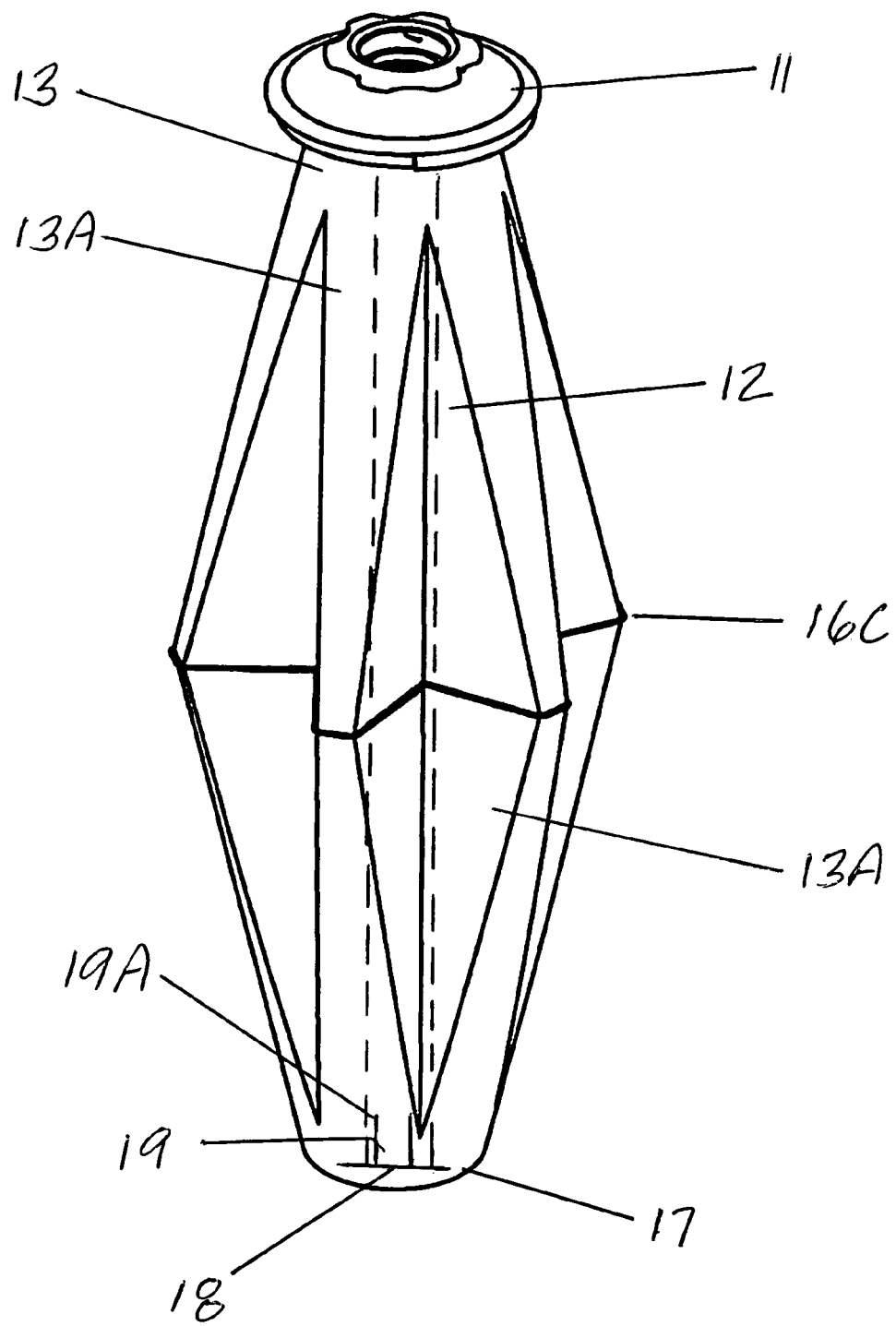
FIG. 5B is another perspective illustration of the dispenser tube assembly.

FIG. 5A shows dispenser tube 12 after it has been partially inserted through annular member and fitment 14 and 15, respectively, and into the interior of bladder 13, with the bladder in an unexpanded and axially extended configuration, with the bladder forming six (6) generally uniform, longitudinal wave-like segments 13A. The bladder 13 forms the six (6) wave-like segments when it is unexpanded and axially extended due to the fact that the bladder, as previously described, is constructed by welding together circular bladder sheets 16A and 16B, forming seam 16C. And, FIG. 5B illustrates the completed assembly of dispenser tube assembly 10, with dispenser tube 12 (shown in dashed lines) completely disposed within the interior of bladder 13, with bladder 13 releasably connected to dispenser valve 11, with the bottom end of dispenser tube 12 releasably attached to centering fitment 17 (shown in dashed lines) by releasably engaging distal ends 19A of L-shaped members 19 with the bottom inside surface of the dispenser tube 12, and with the bottom end of the dispenser tube abutting the L-shaped members 19 in order to allow beer to flow up through the dispenser tube. Since the centering fitment 17 is attached to the geometric center of the bottom bladder sheet 16B, the releasable attachment of dispenser tube 12 to centering fitment 17 ensures that bladder is evenly distributed around the dispenser tube, which in turn ensures that the bladder will expand symmetrically around the tube.

Figure 5C:
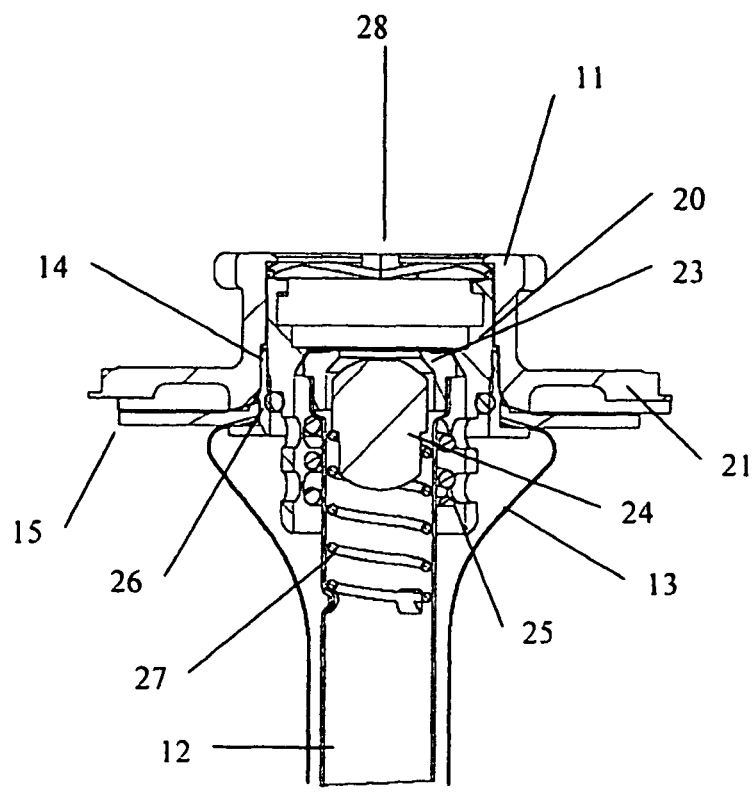
FIG. 5C is a partial cross-sectional plan view of the dispenser tube assembly.

Dispenser tube assembly 10 is further illustrated in the partial cross-sectional plan view diagram of FIG. 5C, showing bladder 13 releasably and concentrically connected to dispenser valve 11 by inserting fitment 14 between resilient O-ring 25 and flange 21 of dispenser valve 11, and with the resiliency of O-Ring 25 providing a sufficient radial force to maintain the connection between fitment 14 and flange 21 but, at the same time, allowing bladder 13 to be easily removed from the dispenser valve by applying a slight downward force on the bladder.

Once dispenser tube assembly 10 has been assembled, the assembly can be inserted through the opening within valve attachment collar 4 as shown in FIG. 1. Then, as shown in the partial cross-sectional diagram of FIGS. 6A through 6C and in the cross-sectional diagram of FIGS. 8A and 8B, dispenser tube assembly 10 can be releasably connected to keg body 2 by attaching dispenser valve 11 to the valve attachment collar 4 attached to the top portion of the keg body. Two arcuate-shaped valve flange segments, integral with annular flange 21 that is integral with dispenser valve 11, extend radially outward and away from annular flange 21, with each flange segment extending approximately 90° around annular flange 21 and positioned such that each end of a flange segment is spaced 90° away from the end of an adjacent flange segment. A pair radially extending cantilever arms 29 is formed within annular flange 21 such that the end of each cantilever arm can flex in a vertical direction when subjected to a vertical load, with the cantilever arms positioned 180° apart and with each arm extending through a respective flange segment. Two arcuate-shaped collar flange segments, integral with the axially extending inside sidewall of collar 4, extend radially inward, with each collar flange segment extending approximately 90° around the inside sidewall of collar 4 and positioned such that each end of a collar flange segment is spaced 90° away from the end of an adjacent collar flange segment. Each collar flange segment has a varying thickness, as measured in an axial direction parallel to the sidewall of collar 4, with the thickness increasing in a clockwise direction along the flange segment, thereby creating a ramp-like surface on the under-side surface of each collar flange segment. Finally, a notch is formed through each collar flange segment and is positioned adjacent to the thicker end of the flange. In operation, dispenser valve 11 is releasably attached to collar 4 by inserting the valve flange segments between the collar flange segments, as shown in FIG. 6B, and rotating valve 11 in a clockwise direction, as illustrated in FIG. 6C, which causes each of the valve's cantilever arms to slide along a respective collar's ramp-like surface until the pair of cantilever arms 29 engage a respective collar flange notch. When the beer has been completely dispensed from the reusable beer keg 1, the dispenser tube assembly 10 is easily removed from keg body 2 by simply pressing down on the ends of the pair of cantilever arms, thereby releasing the arms from the collar flange notches, simultaneously rotating the dispenser valve 11 in a counter-clockwise direction, and lifting the dispenser tube assembly from keg body 2.

Figure 6A:
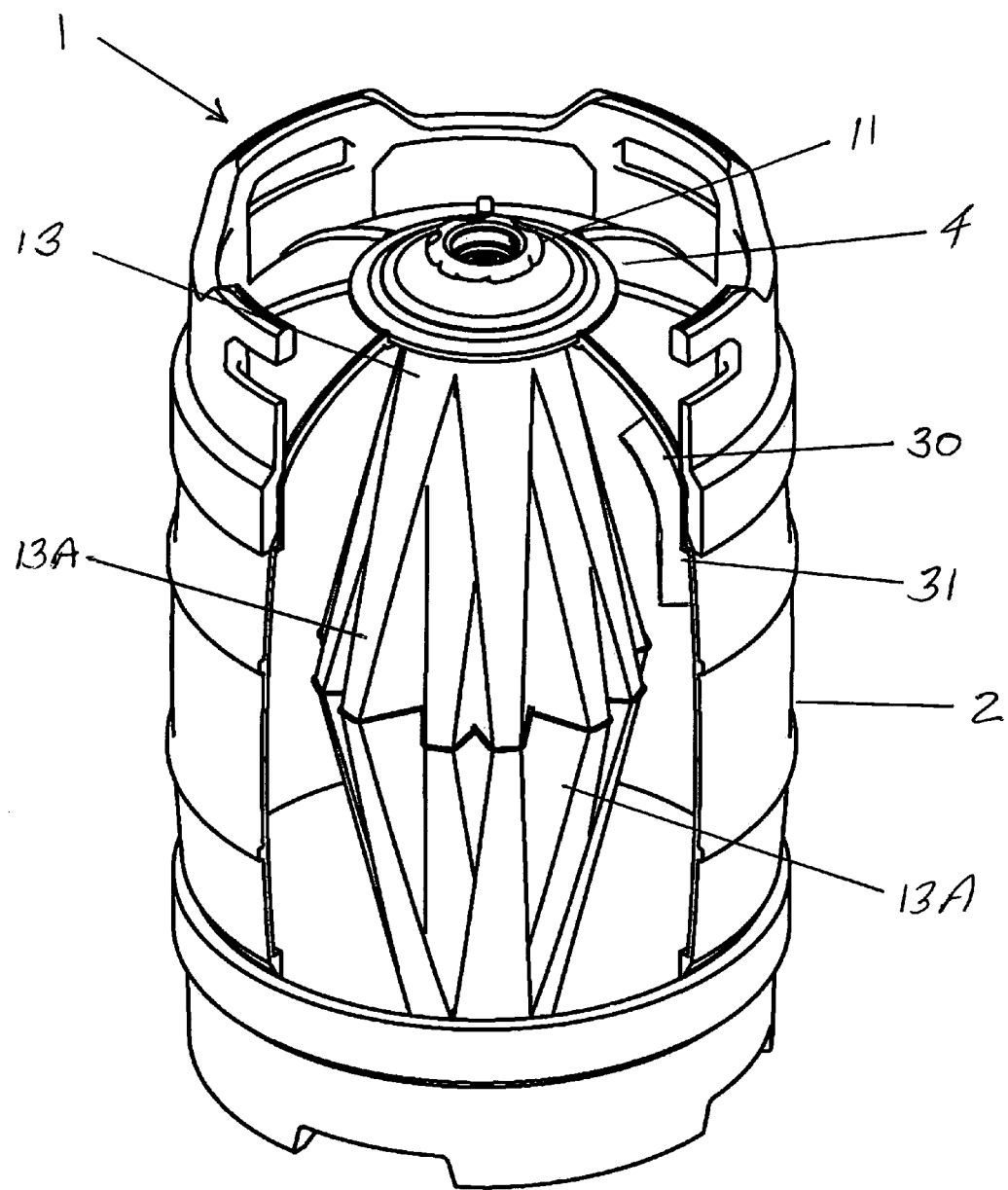
FIG. 6A is a partial cross-section of a front perspective view of the reusable beer keg with the dispenser tube assembly releasably connected to the keg body.
Figure 6B:
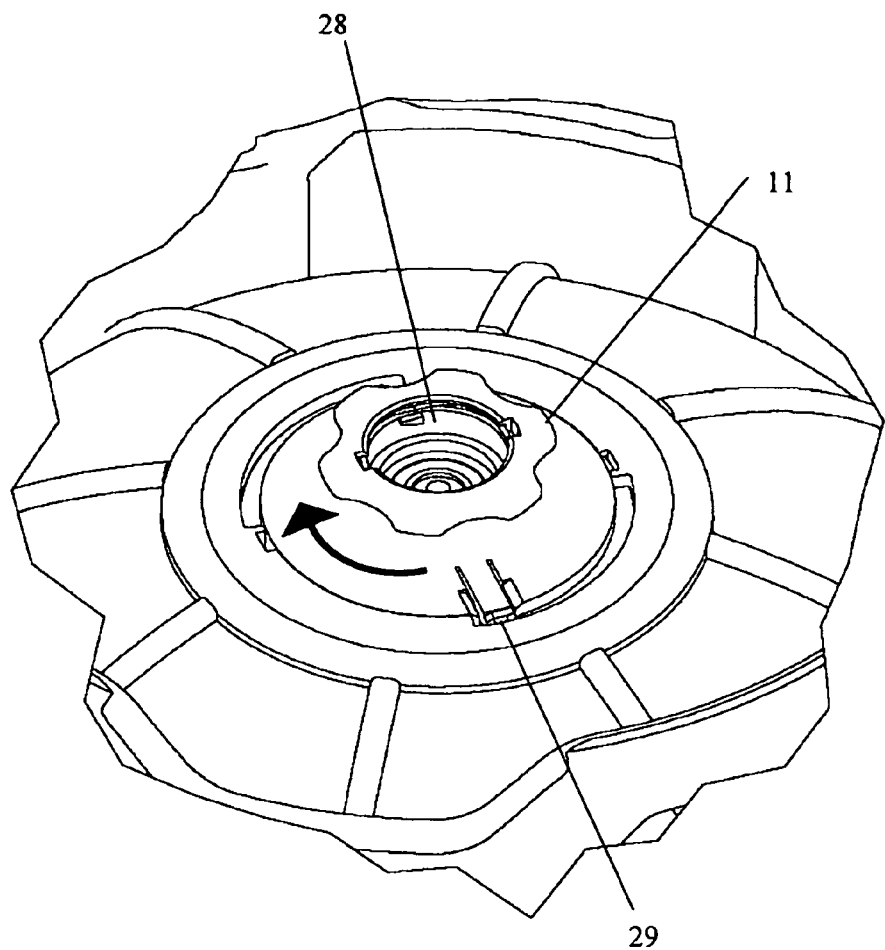
FIGS. 6B and 6C are partial perspective views of a top portion of the keg body, illustrating the dispenser valve in an unlocked and locked position, respectively.
Figure 6C:
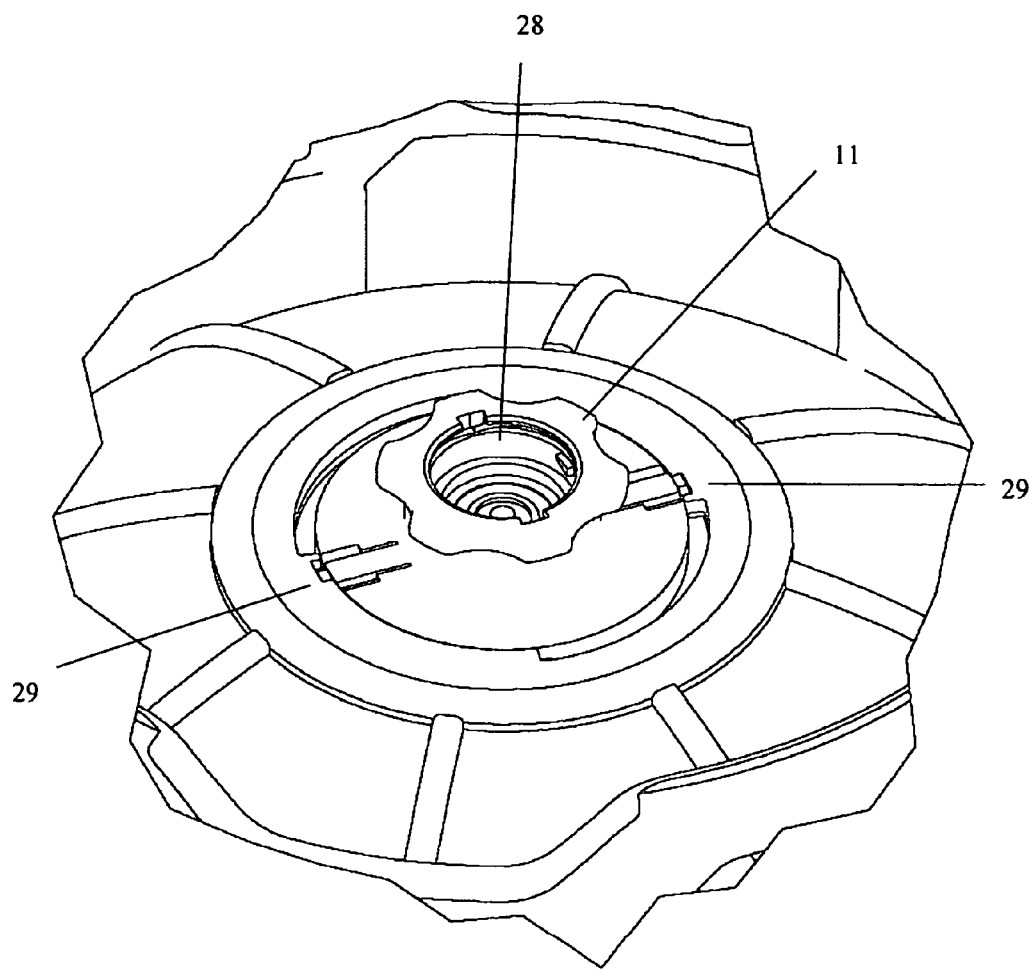
Figure 7:
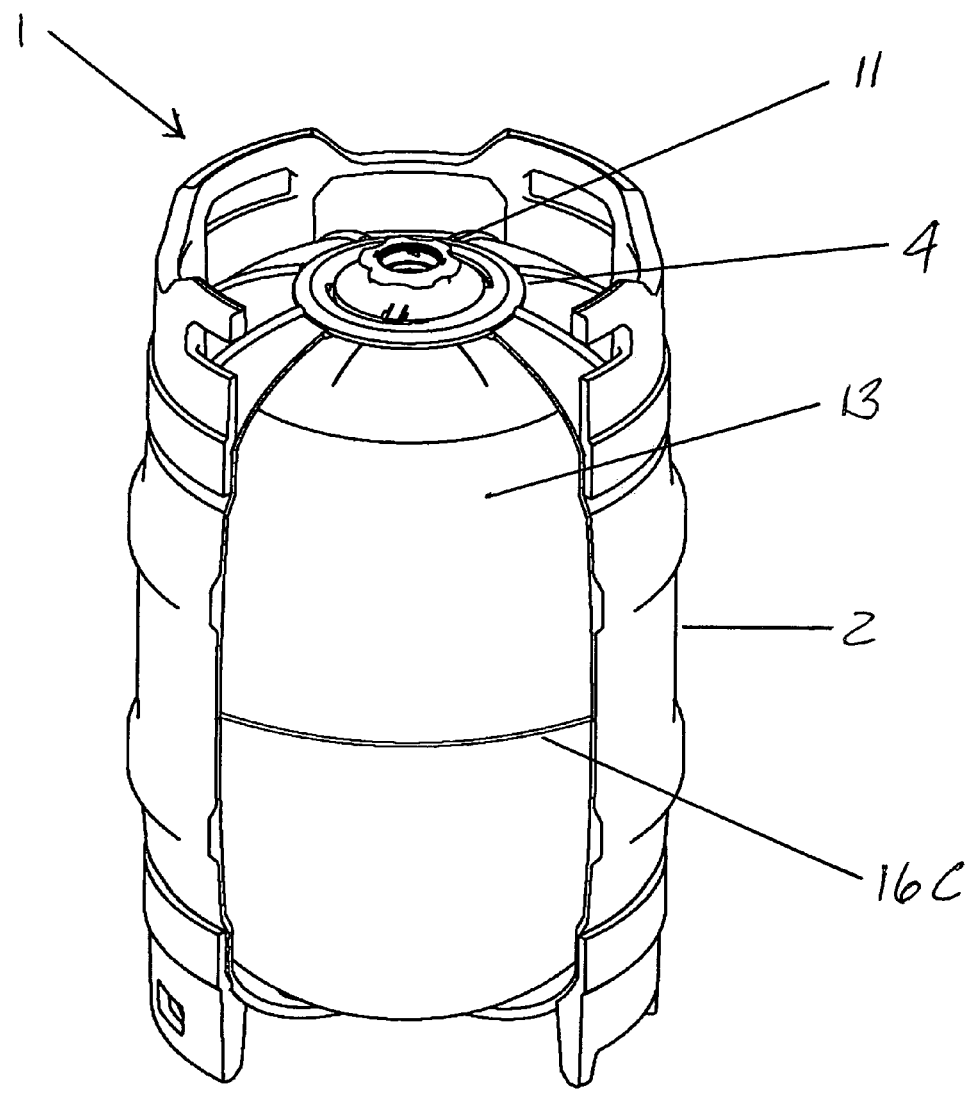
FIG. 7 is the same illustration as in FIG. 6A but further illustrates that the bladder has expanded so as to contact the inner surface of the keg body when the bladder is full of beer.

Once dispenser tube assembly has been attached to keg body 2, as shown in FIG. 6A, the reusable beer keg 1 is ready to be filed with and dispense beer. During the operation of filling beer keg 1 with beer, beer flows through an open dispenser valve 11 and into the interior of bladder 13. As the beer continues to flow into bladder 13, the bladder will begin to expand symmetrically around dispenser tube 12. Further, since dispenser tube assembly 10 is concentrically positioned within the interior of keg body 2, when the filing operation is completed, the beer will have caused bladder 13 to expand until the outside surface of the bladder contacts with the inside surface of keg body 2, as shown in FIG. 7, in a uniformly distributed manner.

Figure 8A:
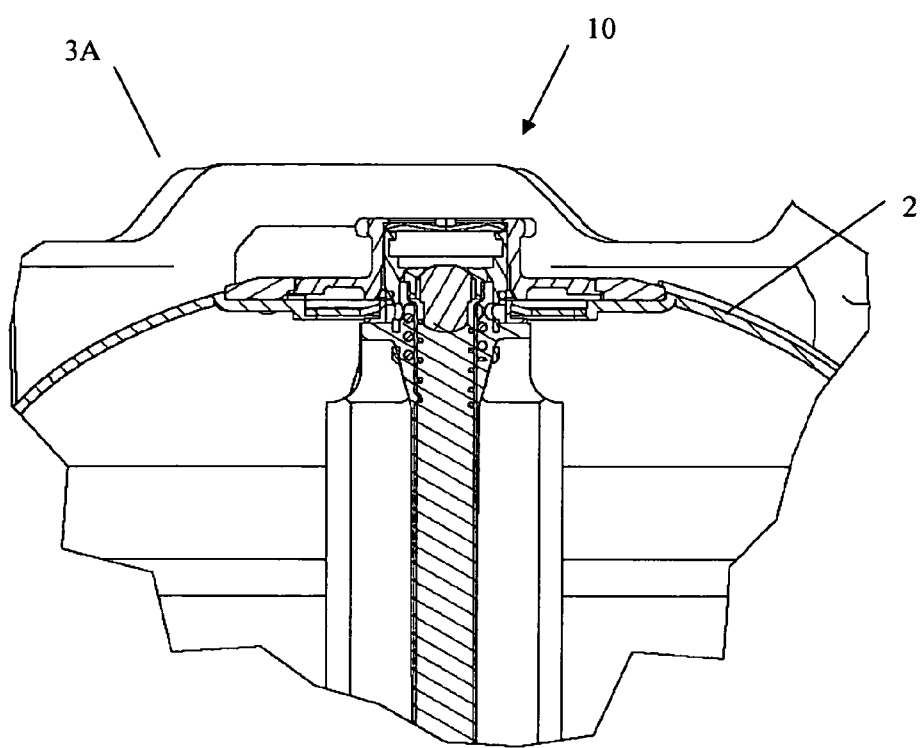
FIG. 8A is a partial cross-section of the dispenser tube assembly with the dispenser valve closed and FIG. 8B illustrates the dispenser tube assembly with the dispenser valve open.
Figure 8B:
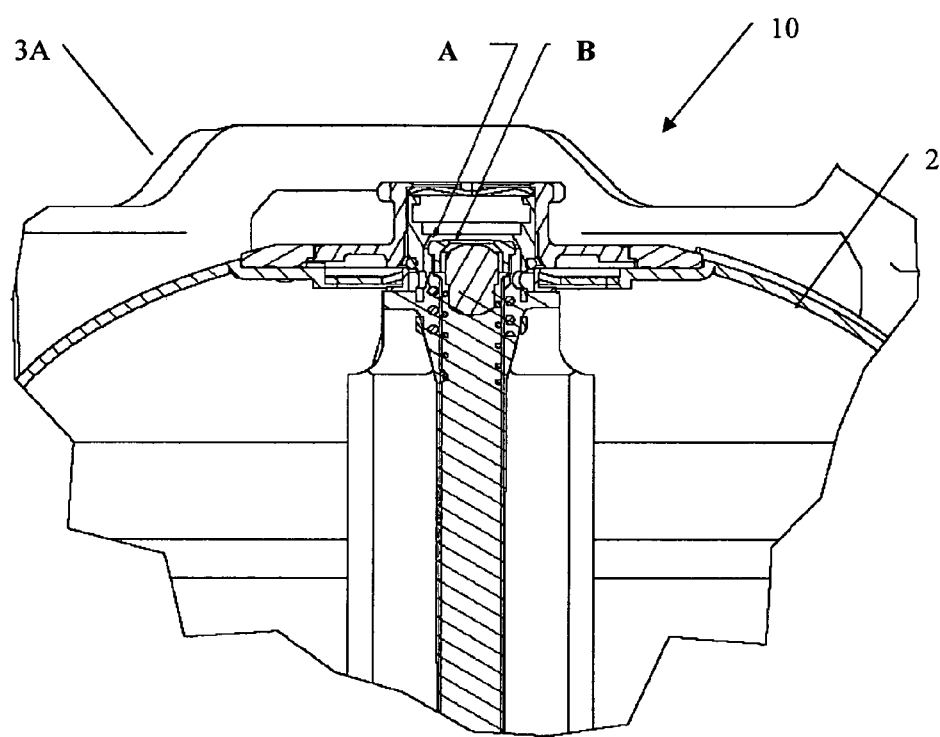

Referring now to FIGS. 5C, 8A and 8B, a more detailed description of the operation of dispenser valve 11 is presented. When a beer tap (not shown) is connected to the inlet port 28 of dispenser valve 11, the tap presses on the valve body's outer annular seal 20 causing the seal and dispenser tube 12 to move in a downward direction against the force of outer valve spring 25 and to thereby open the valve by creating an valve inlet gap A between the valve body 20 and seal 23. Once dispenser valve 11 is in the open configuration, pressurized beer can be delivered to the interior of bladder 13 through the valve inlet gap. And, as the beer enters bladder 13, it causes the bladder to unfurl until outside surface of the bladder contacts substantially the entire inside surface of keg body 2, at which point beer keg 1 has been filled with beer. In order to dispense the beer, pressurized $CO_2$ gas is supplied through the beer tap and valve inlet gap A. A tap spigot can then be opened, which depresses seat 24 downward against interior valve spring 27, thereby creating a valve outlet gap B within the dispenser valve 11 between seat 24 and the seal 23. Beer is then forced from the bladder up through the bottom opening of dispenser tube 12, through the valve outlet gap B within dispenser valve 11, and out of the tap spigot.

When the beer keg has been emptied, it can be returned to the brewery where dispenser tube assembly 10 is removed from keg body 2 by unlocking dispenser valve 11 from its engagement with valve attachment collar 4. Used disposable bladder 13 can then be removed from its engagement with dispenser valve 11 by pulling on the bladder in a direction generally parallel to dispenser tube 12 in order to cause valve fitment 14 to slide out from between O-Ring 25 and flange 21 of dispenser valve 11. Used bladder 13 is then disposed of in any appropriate manner for the recycling of plastic material generally. Dispenser valve 11 and dispenser tube 12 are then cleaned and, along with the use of a new bladder 13, are used to reassemble dispenser tube assembly 10 as previously described. Then the reassembled dispenser tube assembly 10 is attached to the used beer keg body 2 by connecting the assembly to the keg body as described above. In this regard, there is no need to clean the used beer keg body because the beer does not come into contact with the keg body; rather the beer only contacts the interior surface of bladder 13. The used beer keg 1 is now ready for being refilled with beer and delivered to a commercial establishment.

Now, referring back to FIG. 6A, in another embodiment a temperature sensor and display device 30, such as thermochromatic liquid crystal temperature indicator, can be disposed within an opening through the top portion of keg body 2. Further, a heat transfer strip 31, preferably made of aluminum or an aluminum alloy, having a curved top portion and a straight bottom portion, can be disposed adjacent to the inside surface of keg body 2, with the curved top portion positioned so as to contact the bottom surface of sensor and display device 30 and its straight bottom portion positioned approximately half way down the inside vertical surface of keg body 2. When beer is supplied to the interior of disposable bladder 13, causing the bladder to unfurl and its outside surface to contact the inside surface of keg body 2, the outside surface of the bladder also comes into contact with heat transfer strip 31. In this regard, the temperature of the beer when it leaves the brewery will be normally maintained at a target temperature of about 38° F. After a relatively brief period of time, the temperature of heat transfer strip 31 will become approximately equal to the temperature of the beer, and a temperature of the beer will be displayed on sensor and display device 30, in this case it will display 38° F. As the temperature of the beer inside bladder 13 changes, the change is sensed heat transfer strip 31 and sensor and display device 30 and displayed on the device. In this manner, it can be accurately and easily determined whether the temperature of the beer in the keg has changed from its "target" temperature by simply looking at the display on temperature sensor 30.

FIGS. 9A and 9B illustrate that the beer kegs of the present invention can be easily stacked together and held firmly in place. A top portion of cylindrical member 3A, attached to keg body 2, contains four arcuate shaped axially extending flanges that are integral with cylindrical member 3A and are equally spaced around its perimeter, with the top surface of each of the flanges being formed into a convex shape. Each flange also contains an elongate top slot that extends through the flange. Similarly, a bottom portion of cylindrical member 3B, attached to keg body 2, contains four arcuate shaped axially extending feet that are integral with cylindrical member 3B and are equally spaced around its perimeter, with the bottom surface of each of the feet being formed into a concave shape. Each foot also contains an elongate bottom slot that extends through the flange. As shown in the figures, when the beer kegs are stacked on top of each other, the concave shape of the bottom surface of the feet approximately mates with the convex shape of the top surface of the top flanges, thereby providing some stability to the stack. Further stability can be provided by using a resilient strap 35, having a hook portion on each end, with the hook portion on one end of the strap engaging with a top slot and with the hook portion on the other end of the strap engaging with a bottom slot. Similarly, one or more additional resilient straps 35 can be attached in like fashion around keg body 2. In addition to implementing the feature of being able to further secure the stack of kegs, the top and bottom elongate slots can also be used as handholds.

Although a preferred embodiment and other embodiments have been described, it will be recognized by those skilled in the art that other embodiments and features can be provided without departing from the underlying principals of those embodiments. The scope of the invention is defined by the appended claims.

We claim:

1. A reusable beer keg, comprising:
   a hollow beer keg body with the keg body having a keg opening through the keg body for providing access to the interior of the keg body;
   a dispenser valve;
   a dispenser tube with a top end of the dispenser tube connected to the dispenser valve;
   a dispenser tube assembly comprising a disposable bladder having a bladder opening and a centering fitment attached to the bladder, with the dispenser tube disposed through the bladder opening, with the dispenser valve releasably attached to the bladder opening, and with a bottom end of the dispenser tube releasably attached to the centering fitment;
   whereby the dispenser tube assembly can be disposed through the keg opening, with the dispenser valve releasably attached to the keg body, and the dispenser valve can be operated to supply beer to the interior of the bladder and then operated to supply gas pressure to the beer, causing the beer to flow through the dispenser tube and dispenser valve.

2. The reusable beer keg of claim 1 in which the keg body is a one-piece plastic unit.

3. The reusable beer keg of claim 1 in which the disposable bladder is flexible, impermeable to beer, substantially impermeable to oxygen, and substantially inert when in contact with said beer.

4. The reusable beer keg of claim 1 also comprising a temperature sensor that is attached to the keg body and a heat transfer strip that is in communication with the temperature sensor and disposed adjacent to the keg body.

5. A reusable beer keg, comprising:
   a hollow beer keg body with the keg body having a keg opening through the keg body for providing access to the interior of the keg body;
   a dispenser valve;
   a dispenser tube with a top end of the tube connected to the dispenser valve;
   a dispenser tube assembly comprising a disposable bladder having a top and bottom circularly shaped bladder sheet, with the perimeter of the top bladder sheet attached to the perimeter of the bottom bladder sheet and with the top bladder sheet having a bladder opening, with the dispenser tube disposed through the bladder opening, with the bladder opening releasably secured to the dispenser valve, and with a bottom end of the dispenser tube releasably attached to a centering fitment attached to an inside surface of the bottom bladder sheet and with the bottom end of the dispenser tube extending into the interior of the bladder, thereby forming six longitudinal wave-like segments within the disposable bladder; and
   whereby the dispenser tube assembly can be disposed through the keg opening, with the dispenser valve releasably attached to the keg body, and the dispenser valve can be operated to supply beer to the interior of the bladder and then operated to supply gas pressure to the beer, causing the beer to flow through the dispenser tube and dispenser valve.

6. A method for using a reusable beer keg, comprising:
   a) providing a disposable bladder with the bladder having a bladder opening and a centering fitment attached to an inside surface of the bladder;
   b) providing a dispenser tube with the dispenser tube having a first and a second end and with a dispenser valve attached to the first end of the dispenser tube;
   c) releasably attaching the centering fitment to the second end of the dispenser tube; and
   d) releasably attaching the dispenser valve to the bladder opening, thereby creating a dispenser tube assembly;
   e) providing a hollow beer keg body with a keg opening;
   f) releasably attaching the dispenser tube assembly to the keg body by releasably attaching the dispenser valve to the keg opening, thereby creating the reusable beer keg;
   g) dispensing beer into the interior of the disposable bladder;
   h) dispensing pressurized gas into the interior of the disposable bladder, causing the beer to flow up through the dispenser tube;
   i) disassembling the reusable beer keg after it has dispensed the beer by releasing the dispenser valve from its engagement with the keg body, removing the dispenser tube assembly from the interior of the keg body, and releasing the disposable bladder from its engagement with the dispenser valve and centering fitment;
   j) disposing of the disposable bladder;
   k) cleaning the dispenser valve and dispenser tube; and
   l) reassembling the dispenser tube assembly and reusable beer keg as in steps (a) through (f) above by reusing the cleaned dispenser valve and dispenser tube, using a new disposable bladder, and reusing the keg body.

* * * * *